(12) United States Patent
Burger et al.

(10) Patent No.: US 7,891,927 B2
(45) Date of Patent: Feb. 22, 2011

(54) FASTENING APPARATUS WITH TOLERANCE COMPENSATION

(75) Inventors: Ingo Burger, Schloβ Holte (DE); Hans-Ulrich Figge, Schloβ Holte (DE)

(73) Assignee: Bollhoff Verbindungstechnik GmbH, Bielefeld (DE)

( * ) Notice: Subject to any disclaimer, the term of this patent is extended or adjusted under 35 U.S.C. 154(b) by 1113 days.

(21) Appl. No.: 11/583,509

(22) Filed: Oct. 19, 2006

(65) Prior Publication Data

US 2007/0092355 A1    Apr. 26, 2007

(30) Foreign Application Priority Data

Oct. 26, 2005    (DE) .................. 20 2005 016 823 U (51) Int. Cl.
*F16B 43/02*    (2006.01)
(52) U.S. Cl. .................. 411/546; 411/383; 411/384; 411/908
(58) Field of Classification Search .............. 411/6, 411/7, 178, 383, 384, 533, 535, 537, 546, 411/908
See application file for complete search history.

(56) References Cited

U.S. PATENT DOCUMENTS

| | | | | |
|---|---|---|---|---|
| 1,450,625 A | * | 4/1923 | Alexander | 411/535 |
| 3,212,387 A | * | 10/1965 | Madansky | 411/371.2 |
| 4,108,407 A | * | 8/1978 | Cable et al. | 248/656 |
| 4,231,281 A | * | 11/1980 | Reinwall, Jr. | 411/371.2 |
| 4,257,465 A | * | 3/1981 | Berg | 411/147 |
| 4,579,493 A | * | 4/1986 | Schaty | 411/510 |
| 4,732,519 A | * | 3/1988 | Wagner | 411/337 |
| 4,828,444 A | * | 5/1989 | Oshida | 411/437 |
| 5,069,589 A | * | 12/1991 | Lemke | 411/533 |
| 5,190,423 A | * | 3/1993 | Ewing | 411/134 |
| 5,340,258 A | * | 8/1994 | Simon | 411/535 |
| 5,391,033 A | * | 2/1995 | Gibbons | 411/263 |
| 5,967,724 A | * | 10/1999 | Terry | 411/149 |

(Continued)

FOREIGN PATENT DOCUMENTS

DE    200 21 194 U1    5/2002

(Continued)

*Primary Examiner*—Victor Batson
*Assistant Examiner*—Roberta Delisle
(74) *Attorney, Agent, or Firm*—Seyfarth Shaw LLP (57) ABSTRACT

A fastening apparatus for fastening a component B to a component A enables an automatic compensation of tolerances in the separation distance between the two components. The apparatus consists of a receiving element 2, which can be fixed on the component A, an adjustment element 4, which can be screwed to the receiving element via a first thread pairing 28, 48 of a first thread direction, and a fastening screw 6, which can be screwed into the receiving element 2 via a second thread pairing 54, 56 of the opposite thread direction and can be connected with the adjustment element 4 via a detachable drag connection 46, 54, in order to also turn the adjustment element 4 when the fastening screw 6 is turned and to thereby move for the purpose of tolerance compensation in abutment with component B. When screwed to the receiving element 2, the adjustment element 4 can be moved to an end position serving as transport and installation position, in which the receiving element 2 and the adjustment element 4 are held together in one of several pre-determined angle positions via a detachable latch connection.

16 Claims, 6 Drawing Sheets

U.S. PATENT DOCUMENTS

| | | | |
|---|---|---|---|
| 6,062,791 A * | 5/2000 | Simon | 411/535 |
| 6,099,527 A * | 8/2000 | Hochschuler et al. | 606/279 |
| 6,308,476 B1 | 10/2001 | Nakamoto et al. | |
| 6,357,953 B1 * | 3/2002 | Ballantyne | 403/43 |
| 6,364,689 B1 * | 4/2002 | Urso et al. | 439/411 |
| 6,431,602 B1 * | 8/2002 | Ralko et al. | 280/781 |
| 6,497,003 B2 * | 12/2002 | Calabrese | 16/4 |
| 6,585,447 B2 | 7/2003 | Schwarzbich | |
| 6,757,945 B2 * | 7/2004 | Shibuya et al. | 24/662 |
| 6,776,566 B2 * | 8/2004 | Kobusch et al. | 411/546 |
| 6,789,993 B2 * | 9/2004 | Ozawa et al. | 411/546 |
| 2005/0047893 A1 | 3/2005 | Schwarzbich | |
| 2006/0280579 A1 * | 12/2006 | Seidl et al. | 411/546 |

FOREIGN PATENT DOCUMENTS

| | | |
|---|---|---|
| DE | 20 2005 009 017 U1 | 9/2005 |
| EP | 1 503 088 A1 | 2/2005 |

* cited by examiner

FASTENING APPARATUS WITH TOLERANCE COMPENSATION

BACKGROUND OF THE INVENTION

The present invention relates to a fastening apparatus for fastening a component B to a component A with automatic compensation of tolerances in the separation distance between the two components.

Many varieties of such fastening apparatuses with tolerance compensation are known. They normally consist of an adjustment bushing with a so-called drag section, which can establish a friction connection with a fastening screw. When turning the fastening screw, the adjustment bushing is thus also turned until it is attached to one of the two components, whereupon the friction connection is overridden when the fastening screw is turned further and the torque increases accordingly so that both components can then be tensioned with each other by the fastening screw via the adjustment bushing.

This type of tolerance compensation arrangement is known from German utility model no. 20 2005 009 017.4, in which the adjustment element consists of the actual adjustment bushing and a separate driver. The driver is connected with the adjustment bushing in a detachable manner and has several clamp sections distributed in the circumferential direction, which form the friction connection (drag connection) with the thread of the fastening screw. The receiving element and the adjustment bushing are made up of a relaxation-poor plastic, in particular a duroplast. The driver is made of an elastically pliable plastic, in particular a thermoplast. The receiving element has a fastening section with a self-furrowing and/or self-forming thread, which can be screwed into the one component for producing a screw connection, wherein the screw connection is a plastic-in-plastic screw connection. The driver and the receiving element are provided with locking mechanisms in the form of nubs of the driver and the receiving element that are distributed over the perimeter and that lock together to serve as a transport safeguard.

SUMMARY OF THE INVENTION

The object of the present invention is to further the design of a fastening apparatus with automatic tolerance compensation of the specified type such that the production and installation of the fastening apparatus are simplified.

In the case of the fastening apparatus in accordance with the invention, not only the receiving element but also the adjustment element is designed as a single piece. When screwed to the receiving element, the adjustment element can be moved to an end position serving as transport and installation position, in which the receiving element and the adjustment element are held together in one of several pre-determined angle positions via a detachable latch connection.

Preferably, the receiving element and the adjustment element have non-circular circumferential contours, in particular multi-edged contours, which align with each other in the predetermined angle positions, for attaching a joint spanner. Advantageously, the detachable drag connection has a larger release torque than the latch connection so that the latch connection is released during the installation of the fastening apparatus before the drag connection is released.

Since, in the fastening apparatus developed according to the invention, the adjustment element consists of just one single element rather than two separate elements, the constructive design of the fastening apparatus and the production of their individual elements are simplified. Furthermore, since the receiving element and the adjustment element can be operated together based on the detachable latch connection and can in particular be attached to the associated component by means of a joint spanner, the installation of the fastening apparatus is also simplified.

BRIEF DESCRIPTION OF THE DRAWINGS

An exemplary embodiment of the invention is explained in greater detail based on the drawings.

DETAILED DESCRIPTION OF PREFERRED EMBODIMENTS

Figure 10:
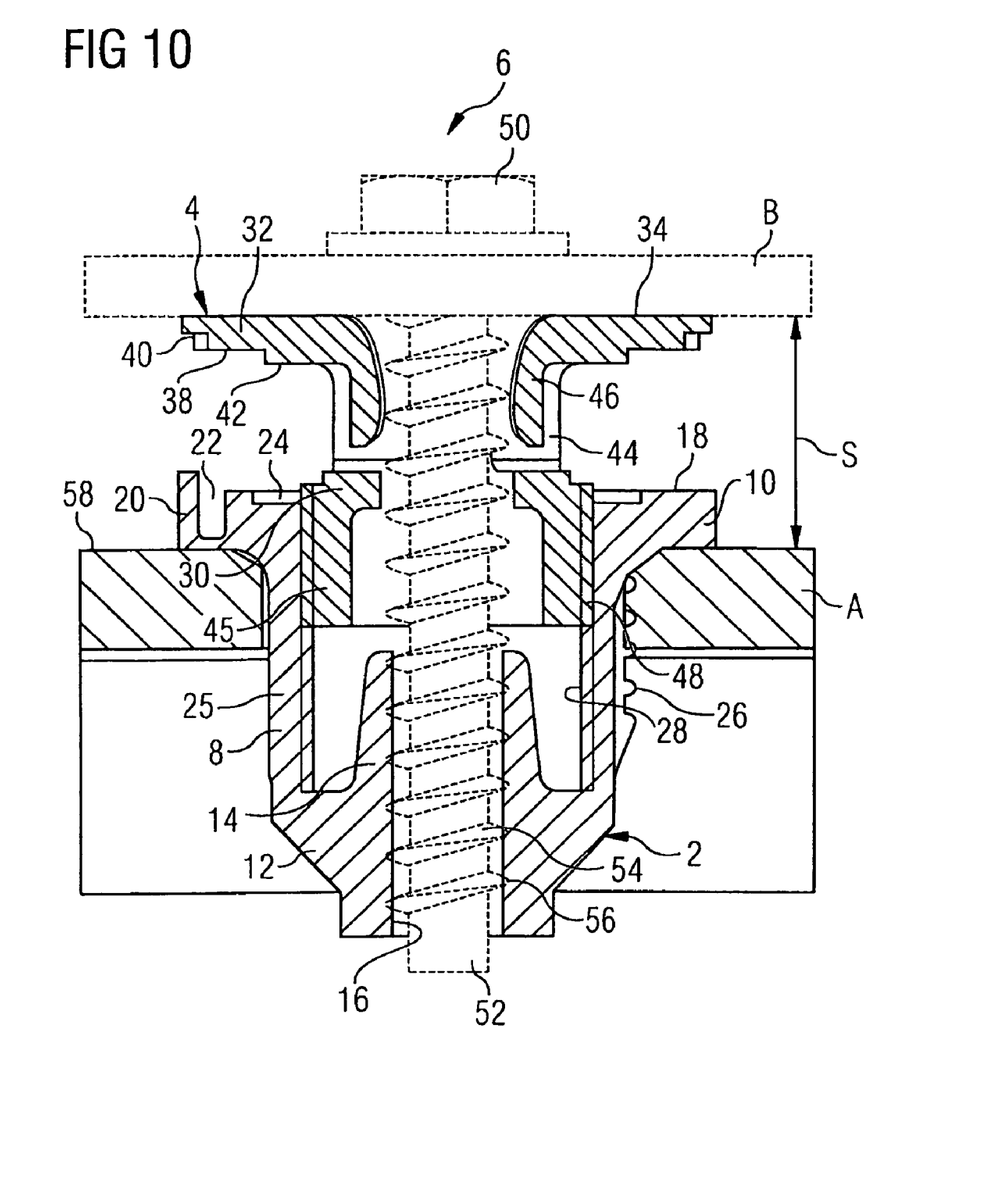
FIG. 10 shows a sectional view of an installed fastening apparatus developed according to the invention.

The fastening apparatus shown in FIG. 10 serves to fasten a component B to a component A. The component A is for example an automobile bracket, while component B is a part of a headlight housing immobilized by gauges. The component A and the component B have a separation distance S, which can vary based on installation- and/or production-caused tolerances. The fastening apparatus shown enables an automatic compensation of these tolerances. Since the headlight housing can also be guided at other locations (not shown), a force-fit connection is not required between components A and B at this location; i.e. when installed, a lateral displacement of components A and B is still possible if necessary upon overcoming the corresponding friction.

The fastening apparatus is made up of a receiving element 2, an adjustment element 4 and a fastening screw 6. The receiving element 2 and the adjustment element 4 form a pre-installable structural unit E (see FIG. 7 through 9), as will be described in greater detail.

Figure 4:
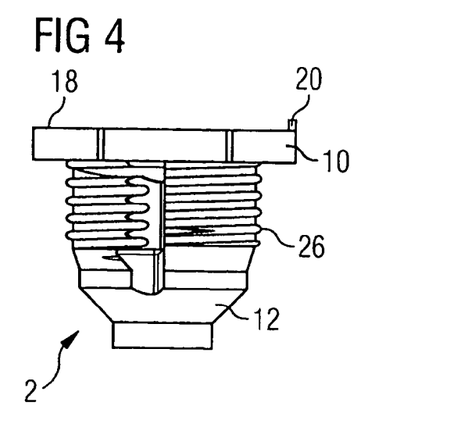
FIG. 4 shows a lateral view of a receiving element.
Figure 5:
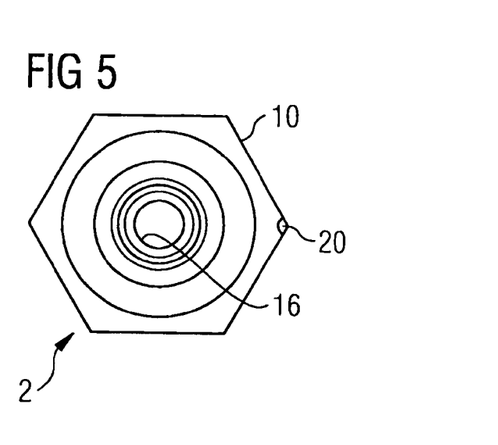
FIG. 5 shows a view from the top of the adjustment element in FIG. 4.
Figure 6:
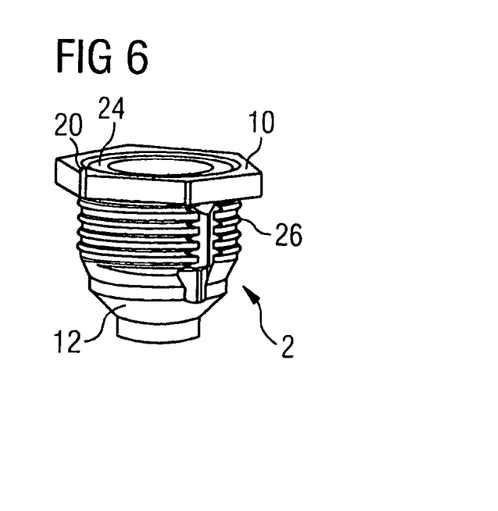
FIG. 6 shows a perspective view of the adjustment element in FIGS. 4 and 5.

Now, in addition to FIG. 10, reference is made to FIGS. 4 through 6, in which the receiving element 2 is shown in detail. The receiving element 2 designed as a single piece consists of a sleeve-shaped body 8, which switches over to a flange 10 on its one axial end and to a conical insertion section 12 on its other axial end. An axially inward running, sleeve-shaped socket 14, which is provided with a smooth-walled bore hole 16, is formed on the insertion section 12.

The flange 10 has a front surface 18 lying in a radial plane, in which a single axially running latch protrusion 20 is provided. As can be seen in FIG. 10 (but not shown in FIG. 4 through 6), the latch protrusion 20 is arranged within a recess 22, wherein it runs axially upwards from a lower area of the flange 10 and protrudes beyond the associated front surface 18 of the flange 10 by a specified amount. The purpose of the latch protrusion 20 will be explained in greater detail. Furthermore, a ring-shaped recess 24 is provided in the front surface 18 of the flange 10.

In the area between the flange 10 and the insertion section 12, the sleeve-shaped body 8 of the receiving element 2 consists of a sleeve-shaped wall 25, on the outside of which an external thread 26 is provided. In this case, the external thread 26 is designed as a self-forming and/or self-furrowing thread, which forms a plastic-in-plastic thread connection with a smooth-walled bore hole 60 of the component A, as is e.g. known from DE 10 2004 021 484. However, the receiving element 2 could also be immobilized on component A in another manner. Furthermore, the receiving element 2 is provided with an internal thread 28, which spans the inside of the sleeve-shaped wall 25 and the flange 10.

Figure 1:
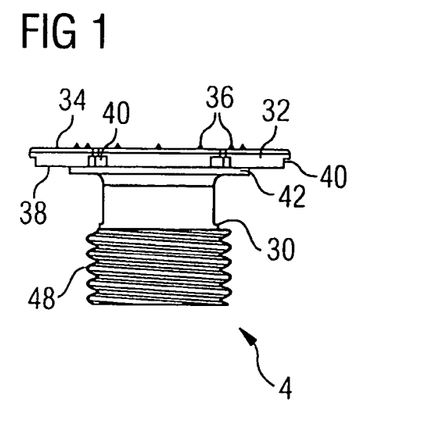
FIG. 1 shows a lateral view of an adjustment element.
Figure 2:
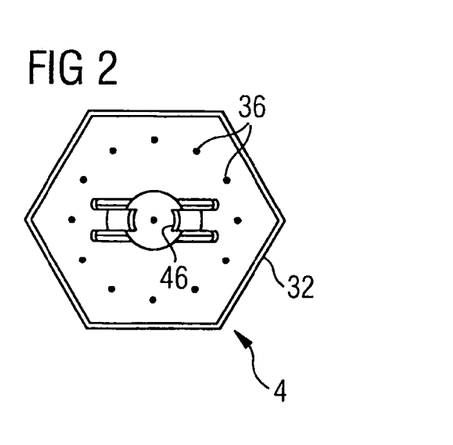
FIG. 2 shows a view from the top of the adjustment element in FIG. 1.
Figure 3:
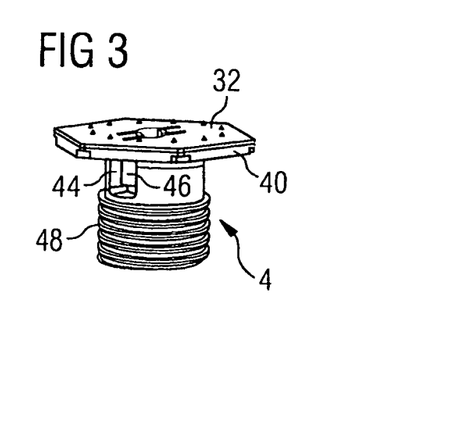
FIG. 3 shows a perspective view of the adjustment element in FIGS. 1 and 2.

Now, in addition to FIG. 10, reference is made to FIGS. 1 through 3, which show the adjustment element 4 in detail. The adjustment element 4 consists of a sleeve-shaped body 30, which switches to a flange 32 on its upper end. On its top side, the flange 32 has a front surface 34, on which small nibs 36 projecting axially upwards (see FIG. 1 through 3) are formed.

The flange 32 is provided with a front surface 38 on the side turned away from the front surface 34, in which several latch recesses 40 distributed over the perimeter are formed. The latch recesses 40 work together with the latch protrusion 20 of the receiving element 2 such that they can form a detachable latch connection, which ensures that the receiving element 2 and the adjustment element 4 align with each other in predetermined angle positions, as will be explained in greater detail.

As can be seen in FIGS. 2 and 5 in particular, the receiving element 2 and the adjustment element 4 have non-circular circumferential contours in the area of their flange 10 and 32, each of which are formed hexagonally in the exemplary embodiment shown but can also have other shapes. If these align with each other, a joint spanner (not shown) can be placed on the flanges 10 and 32 in order to jointly turn the receiving element 2 and the adjustment element 4.

A ring-shaped socket 42, which can immerse into the ring-shaped recess 24 of the flange 10 of the receiving element 2, is provided on the bottom side of the flange 32. In an area below the flange 32, the sleeve-shaped body 30 of the adjustment element 4 is provided with two diametrically opposed windows 44, in which two elastic drag arms 46 are arranged, see in particular FIGS. 3, 9 and 10. The drag arms 46 are designed on the inner perimeter of the flange 32, from there run axially downwards and protrude radially towards the inside such that they can form a drag connection with the screw 6, which will also be explained in greater detail.

The sleeve-shaped body 30 of the adjustment element 4 has an apron-like socket 45 in its lower area, which is provided with an external thread 48 on its perimeter.

The screw 6 is e.g. a conventional steel screw with a head 50, a thread shaft 52 and a self-cutting and/or self-furrowing thread 54, which forms a counter thread 56 when screwed into the smooth-walled bore hole 16 of the receiving element 2.

The components A and B are preferably made of plastic. The component A e.g. made of a glass-fiber-reinforced PP, while the component B is made of a softer plastic, e.g. a PP with talcum.

The receiving element 2 and the adjustment element 4 are also made of plastic, wherein the plastic of the receiving element 2 is advantageously harder than the plastic of the adjustment element 4. For example, the receiving element 2 is made of a fiber-reinforced PPA, e.g. with a glass-fiber content of 50%. For example, the adjustment element 4 is made of a fiber-reinforced PA, e.g. with a glass-fiber content of 30%.

Figure 7:
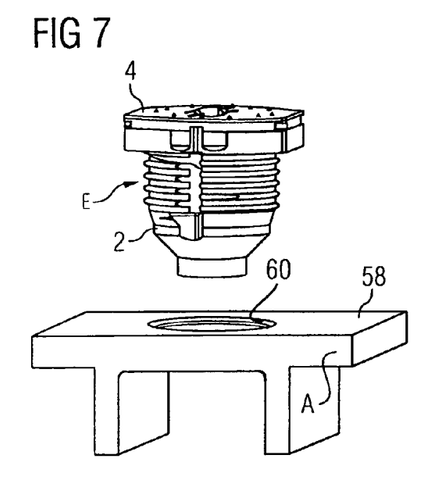
FIG. 7 shows a perspective view of a structural unit consisting of the receiving element and adjustment element and the component A before installation.
Figure 8:
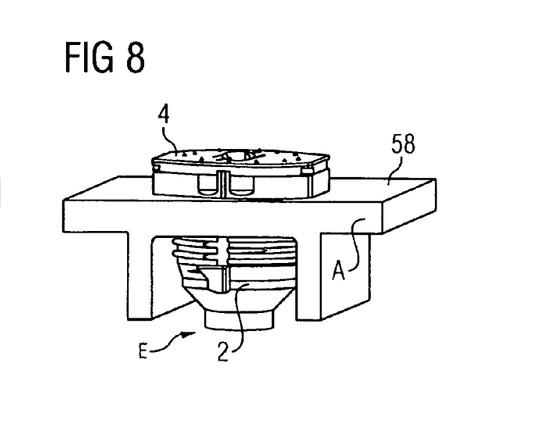
FIG. 8 shows a perspective view according to FIG. 7 after installation of the structural unit E in component A.
Figure 9:
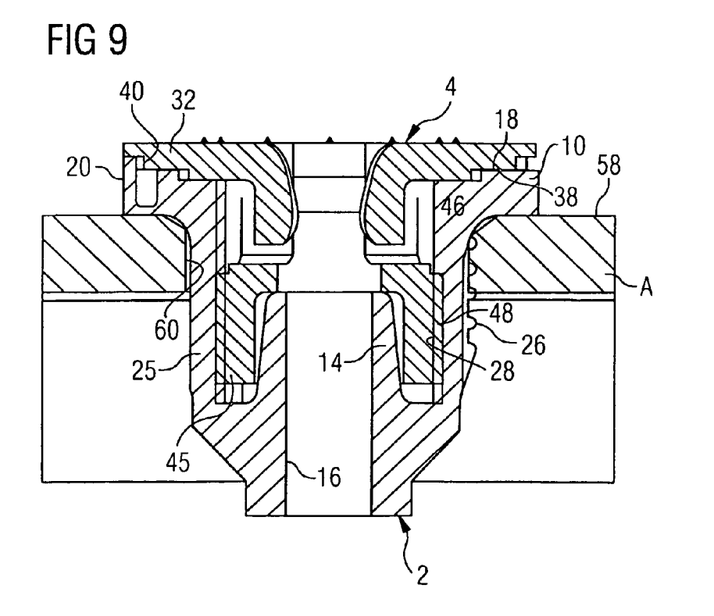
FIG. 9 shows a sectional view of the structural unit E and the component A after installation in accordance with FIG. 8.

The installation and functionality of the fastening apparatus is explained below:

First, the receiving element 2 and the adjustment element 4 are screwed together via the internal thread 28 and the external thread 48 in order to form the preinstalled structural unit E, see FIGS. 7 and 9. When screwing the adjustment element 4 into the receiving element 2, the latch protrusion 20 latches into one of the six latch recesses 40, shortly before the front surfaces 18 and 38 of the flange 10 and 32 of the receiving element 2 and adjustment element 4 come in abutment with each other. In the latched position, the maximum separation distance between the front surfaces 18 and 38 is one-sixth of the thread pitch 28, 48; it is thus equal to the thread pitch, divided by the number of latch recesses.

The latch protrusion 20 and the corresponding latch recess 40 thus form a detachable latch connection, via which the receiving element 2 and the adjustment element 4 are held in a detachable manner in one of six predetermined angle positions. In these angle positions, the receiving element 2 and the adjustment element 4 are thus aligned with respect to each other such that their non-circular circumferential contours (hexagon) are aligned.

The latch connection 20, 40 between the receiving element 2 and the adjustment element 4 fulfills two functions. For one, it serves as a transport safeguard so that the receiving element 2 and the adjustment element 4 can be handled as structural unit E. The latch connection also ensures the receiving element 2 and the adjustment element 4 in one of the six predetermined angle positions, in which the structural unit E can be screwed into the bore hole 60 of the component A through a joint spanner (hexagonal nut not shown), see FIGS. 8 and 9.

As can be seen in FIG. 9 in particular, in the latched position, the apron-like socket 45 of the adjustment element 4 immerses into the annular space between the sleeve-shaped socket 14 and the sleeve-shaped wall 25 of the receiving element 2. Furthermore, the ring-shaped socket 42 of the adjustment element 4 is picked up by the ring-shaped recess 24 of the receiving element 2. This results in a low axial installation length of the structural unit E.

As already mentioned, the external thread 26 of the receiving element 2 is a self-forming or self-furrowing thread, which forms a counter thread in the smooth-walled bore hole 60 of component A. The structural unit E is screwed into the component A until the flange 10 of the receiving element 2 abuts against the top side 58 of the component A, see FIGS. 8 and 9.

Now, the component B of the headlight housing (not shown) can be immobilized by means of gauges in a position, in which it has separation distance S from component A. As already mentioned, the separation distance S can vary based on installation and/or production tolerances. When installing the fastening apparatus, which is now described using FIG. 10 through 14, an automatic tolerance compensation takes place.

Figure 11:
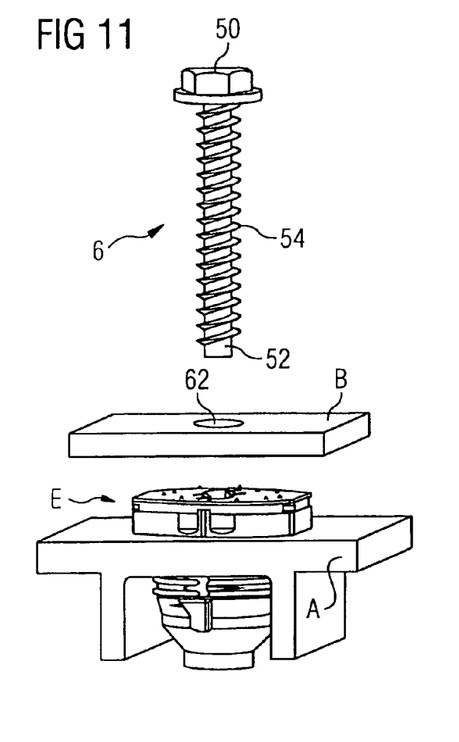
FIG. 11 through 14 show perspective views of different installation states of the fastening apparatus shown in FIG. 10.
Figure 12:
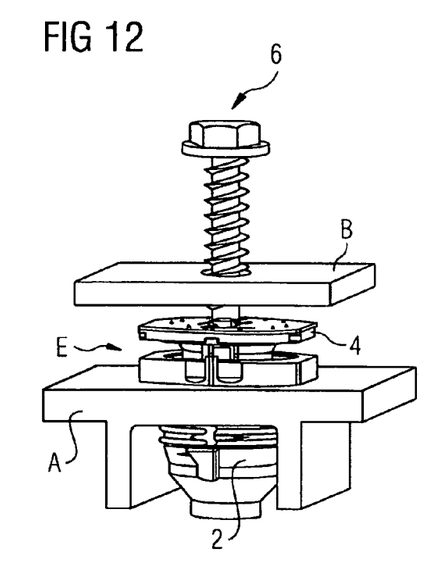
Figure 13:
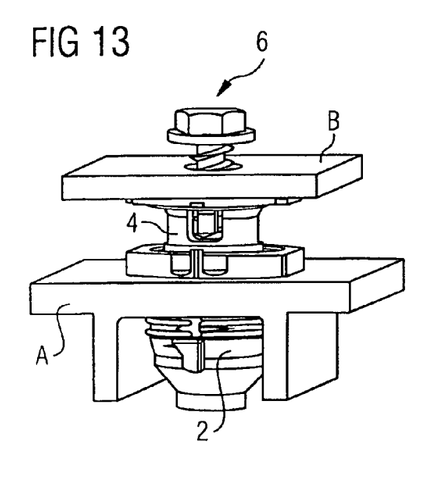

As follows from FIGS. 11 and 12, the screw 6 is first screwed into the structural unit E through a hole 62 of component B. The adjustment element is also turned due to the drag connection between the thread 54 of the screw 6 and the drag arms 46 of the adjustment element 4. The internal thread 28 of the receiving element 2 and the external thread 48 of the adjustment element 4 form a thread connection, which is left-handed in the exemplary embodiment shown. The adjustment element 4 is thus screwed out of the receiving element 2 by the screw 6.

The drag connection between the drag arms 46 and the thread 54 of the screw 6 as well as the latch connection between the latch protrusion 20 and the latch recesses 40 are designed such that the release torque of the drag connection 46, 54 is larger than the release torque of the latch connection 20, 40. This is achieved through geometry and selection of the materials (e.g. high glass-fiber content in the plastic of the adjustment element 4). This ensures that, when dragging the adjustment element 4, the latch protrusion 20 slides out of the concerned latch recess 40 without releasing the drag connection between the thread 54 of the screw 6 and the drag arms 46 of the adjustment element 4.

When the flange 32 is in abutment with component B, the nibs 36 are pressed into the material of component B. The adjustment element is secured in this manner. The structural unit 4 now bridges the separation distance S so that the automatic tolerance compensation is achieved.

When the screw 6 is screwed in further, the release torque (friction torque) of the drag connection 46, 54 is overridden so that the screw 6 is turned relative to the adjustment element 4. The thread 54 of the screw 6 thereby forms the counter thread 56 in the smooth-walled bore hole 16 of the receiving element 2, whereby a second thread connection is created between the screw 6 and the receiving element 2. This second thread connection has a thread direction opposite that of the thread connection 28, 48; thus, in the present exemplary embodiment, the thread 54 of the screw 6 and the counter thread 56 formed in the receiving element 2 are right-handed.

Figure 14:
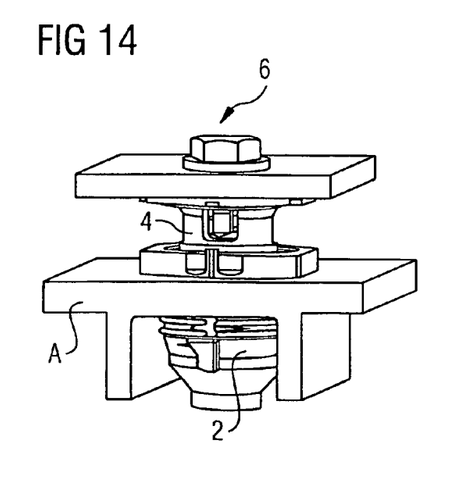

When the screw 6 is screwed in until the installation of the screw head 50 abuts against component B, the fastening apparatus is fully installed, see FIGS. 10 and 14. As already mentioned, this does not necessarily create a force-fit connection, since the components A and B can still be guided at other locations (not shown). However, it is understood that, depending on the application, the fastening apparatus could also establish a force-fit connection between the components A and B.

In the exemplary embodiment shown, the receiving element 2 and the adjustment element 4 have non-circular circumferential contours in the form of a hexagon, which align with each other in the angle positions predetermined by the latch connection. In a modified embodiment, the adjustment element has a different circumferential contour than the receiving element, e.g. a circular contour. However, it must be ensured that the circumferential contour of the adjustment element does not protrude beyond those of the receiving element.

Another modified exemplary embodiment of the invention is explained in greater detail based on FIGS. 15 through 18. The modified embodiment shown in these figures primarily corresponds with the embodiment described based on FIGS. 1 through 14. Identical individual parts were thus labeled with the same reference numbers, while modified individual parts were labeled with the same reference number with the letter a added at the end. The main difference is the design of the latch connection 20a, 40a.

In the exemplary embodiment in FIGS. 15 through 19, the latch protrusion 20a is provided on the adjustment element 4a, while the latch recesses 40a distributed over the perimeter are provided on the receiving element 2a.

Each of the latch recesses 40a is shaped like a notch provided on the front side on flange 10a of the adjustment element 4a, which is bordered on one side by an axially running stop surface 68 and on the other side by an inclined surface 66. Two neighboring latch recesses 40a are connected by two ramp surfaces 70, 72, which run downwards diagonally starting from the two neighboring latch recesses 40a (in FIGS. 16 through 18) and meet at the bottom 74.

The latch protrusion 20a is shaped like a saw tooth, which is bordered on one side by an axially running stop surface 78 and on the other side by an inclined surface 76. The stop surfaces 68, 78 and the inclined surfaces 66, 76 of the latch protrusion 20a and the latch recesses 40a work together, as will be explained in greater detail.

Figure 15:
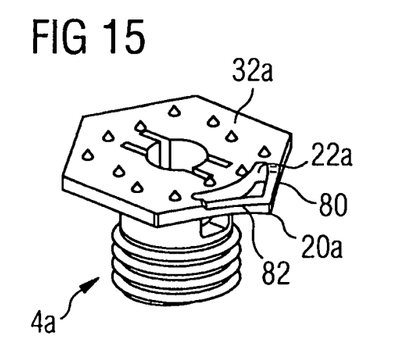
FIG. 15 through 17 show views corresponding to FIGS. 3, 6 and 8 of a modified embodiment of the fastening apparatus.
Figure 16:
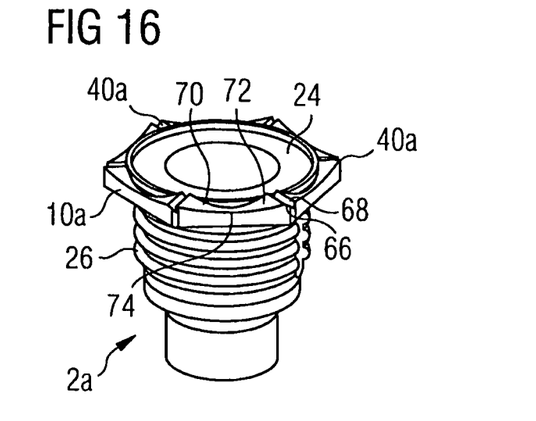
Figure 17:
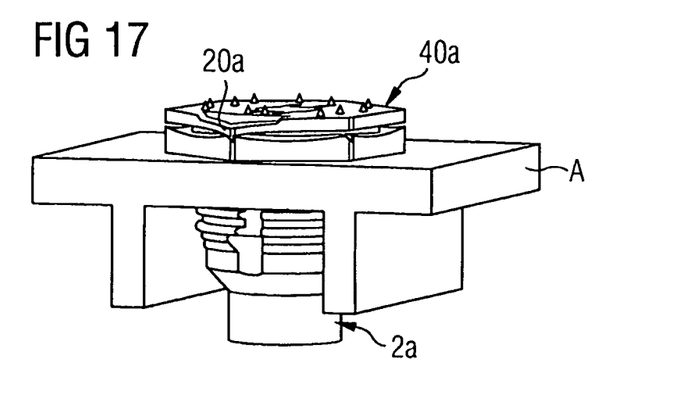
Figure 18:
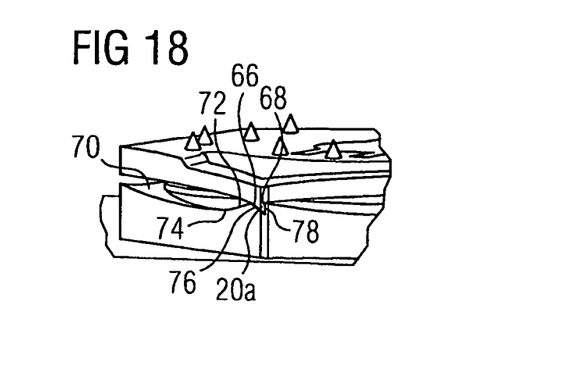
FIG. 18 shows an enlarged view of one detail of FIG. 17.

In the exemplary embodiment in FIGS. 15 through 18, the latch protrusion 20a is provided on a thin material strip, which is made up of two arms 80, 82. As can be seen in FIGS. 15, 17 and 18 in particular, the material strip 80, 82 runs along the outer perimeter of the flange 32a of the adjustment element 4a in the circumferential direction and is designed such that it is separated from the remaining area of flange 32a by a penetrating recess 22a in flange 32a. Thus, the material strip 80, 82 is only formed on its opposite ends on flange 32a of the adjustment element 4a. The two arms 80, 82 of the material strip are tilted downward slightly (in FIGS. 15, 17 and 18) and meet in latch protrusion 20a. Based on the described geometry and the material (plastic) used, the latch protrusion 20a can be shaped in an axially elastic manner in order to be able to work together with the latch recesses 40a in the desired manner.

If, when screwing the adjustment element 4a to the receiving element 2a, the flange 32a of the adjustment element 4a nears the flange 10a of the receiving element 2a, the latch protrusion 20a slides along the ramp surface 72 of one of the latch recesses 40a until the latch protrusion 20a snaps into the corresponding latch recesses 40a (see FIGS. 17, 18). In this latched position, the axially running stop surfaces 68, 78 of the adjustment element 4a and the receiving element 2a abut against each other such that further turning of the adjustment element 4a relative to the receiving element 2a is prevented. The danger of a blocking of the adjustment element 4a and the receiving element 2a is thus avoided.

The turning of the adjustment element 4a in the direction opposite the receiving element 2a is enabled by the inclined surfaces 66, 76. In this embodiment, the release torque defined by the inclined surfaces 66, 76 is also less than the release torque of the drag connection. Thus, if, during the tolerance compensation process, the screw is screwed into the adjustment element 4a, the fastening screw can unscrew the adjustment element 4a from the receiving element 2a as in the previous exemplary embodiment, wherein the axially elastic "suspended" latch protrusion 20a slides over the inclined surface 66 of the concerned latch recess 40a.

The latch connection 20a, 40a of the embodiment in FIGS. 15 through 18 is thus characterized by precise functionality and high operational reliability.

Figure 19:
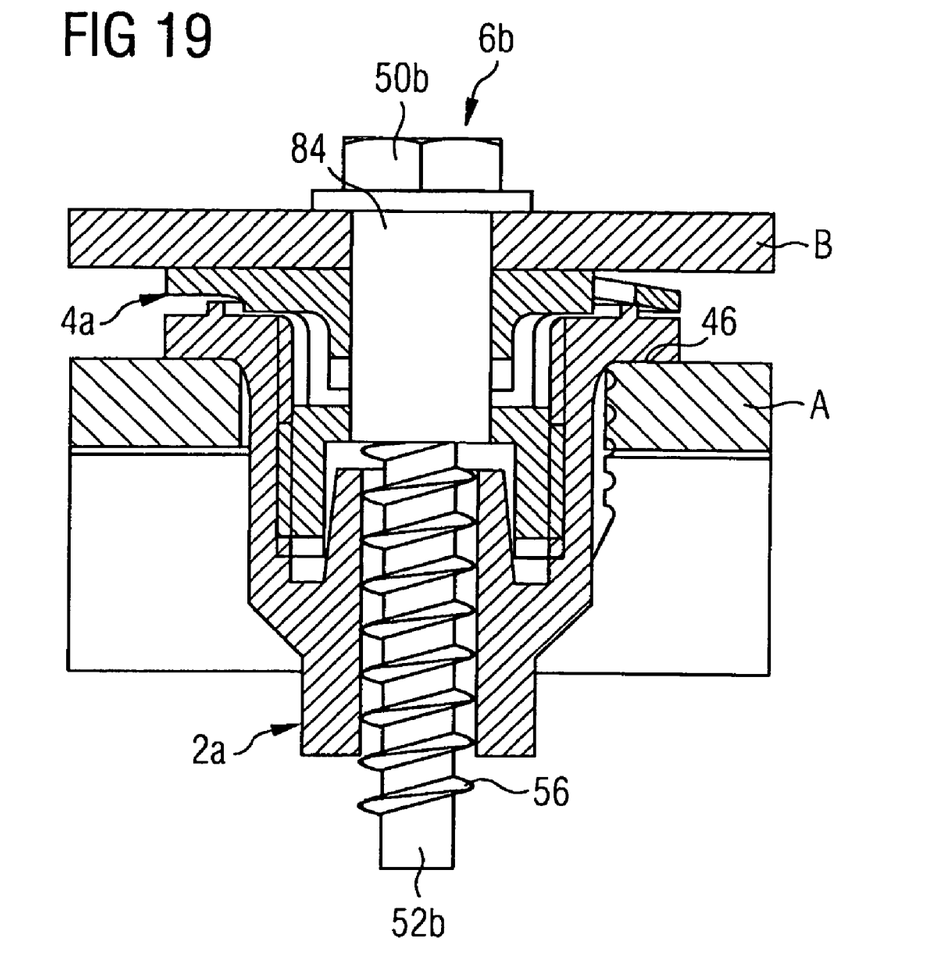
FIG. 19 shows a sectional view corresponding with FIG. 10 of another modified embodiment of the fastening apparatus.

The embodiment of the fastening apparatus shown in FIG. 19 primarily corresponds with the aforementioned embodiments. The main difference is the design of the drag connection between the adjustment element 4a and the screw 6b. In this case, the fastening screw 6b is designed such that a smooth shaft section 84, which has a cylindrical shape in the exemplary embodiment shown, is provided axially between the thread 56 of the screw shaft 52b and the head 50b of the screw 6b. Thus, the elastically deformable drag arms 46 of the adjustment element 4a do not work with the thread 56, but rather with the smooth shaft section 84 in order to form the drag connection. Incidentally, the functionality of the drag connection is the same as in the aforementioned exemplary embodiments.

We claim:

1. A fastening apparatus for fastening a component B to a component A with automatic compensation of tolerances in the separation distance between the component B and the component A, consisting of
    a receiving element, which is designed as a single piece and can be fixed on component A,
    an adjustment element, which is designed as a single piece and can be screwed to the receiving element via a first thread pairing of a first thread direction, and
    a fastening screw, which can be screwed into the receiving element via a second thread pairing of an opposite second thread direction and can be connected with the adjustment element via a detachable drag connection, in order to also turn the adjustment element when the fastening screw is turned and to thereby move for the purpose of tolerance compensation in abutment with component B,
    wherein when screwed to the receiving element, the adjustment element can be moved to an end position serving as transport and installation position, in which the receiving element and the adjustment element are held together in one of several pre-determined angle positions via a detachable latch connection, wherein
    the receiving element and the adjustment element have multi-edged circumferential contours, which align with each other in the predetermined angle positions, for attaching a joint spanner, and the number of edges of which corresponds with the number of predetermined angle positions.

2. The fastening apparatus according to claim 1, characterized in that the detachable drag connection has a larger release torque than the detachable latch connection.

3. The fastening apparatus according to claim 1, characterized in that the detachable latch connection is provided on facing front surfaces of the receiving element and adjustment element.

4. The fastening apparatus according to claim 1, characterized in that the latch protrusion protrudes axially beyond the associated front surface of the receiving element or adjustment element by an amount that is approximately equal to the thread pitch of the first thread pairing, divided by the number of predetermined angle positions.

5. The fastening apparatus according to claim 1, characterized in that the latch protrusion protrudes from a recess in the associated front surface of the adjustment element or receiving element for increasing its elasticity.

6. The fastening apparatus according to claim 1, characterized in that the first thread pairing has an internal thread of the receiving element and an external thread of the adjustment element.

7. The fastening apparatus according to claim 1, characterized in that the second thread pairing has a thread of the screw and a counter thread, which is formed by the thread of the screw in a smooth-walled bore hole of the receiving element.

8. The fastening apparatus according to claim 6, characterized in that the internal thread of the receiving element is formed on a sleeve-shaped wall and the smooth-walled bore hole of the receiving element is formed in a sleeve-shaped socket, which are separated from each other by an annular space, in which the adjustment element immerses in its end position.

9. The fastening apparatus according to claim 1, characterized in that the receiving element has a self-forming and/or self-furrowing external thread, which can be screwed into a smooth-walled bore hole of component A, in order to form together with it a plastic-in-plastic thread connection.

10. The fastening apparatus according to claim 1, characterized in that the non-circular circumferential contours of the receiving element and the adjustment element are formed on flanges, each of which are provided on an axial end of the receiving element and adjustment element.

11. The fastening apparatus according to claim 10, characterized in that the drag connection has elastic drag arms, which are formed on the internal perimeter of the flange of the adjustment element, run primarily axially and can be pressed on radially in line with a thread or a smooth shaft section of the fastening screw.

12. The fastening apparatus according to claim 1, characterized in that the adjustment element on one axial front surface has several nibs, which penetrate into the material of component B when the adjustment element is placed on component B.

13. The fastening apparatus according to claim 1, characterized in that the adjustment element and the receiving element are made of plastic.

14. The fastening apparatus according to claim 13, characterized in that the receiving element consists of a fiber-reinforced plastic, in particular a PPA.

15. The fastening apparatus according to claim 13, characterized in that the receiving element consists of a fiber-reinforced plastic, in particular a PA.

16. The fastening apparatus according to claim 1, characterized in that the detachable latch connection has a single latch protrusion and several latch recesses, the number of which corresponds with the number of predetermined angle positions.

* * * * *